United States Patent [19]

Henline et al.

[11] 4,117,902

[45] Oct. 3, 1978

[54] ENGINE COOLING SYSTEM FOR A SKID-STEER LOADER

[75] Inventors: John W. Henline; James J. Bauer, both of Lisbon; James O. Morehouse, Havana, all of N. Dak.

[73] Assignee: Clark Equipment Company, Buchanan, Mich.

[21] Appl. No.: 766,109

[22] Filed: Feb. 7, 1977

[51] Int. Cl.² .............................................. B60K 11/04
[52] U.S. Cl. ............................... 180/54 R; 123/41.48; 180/68 R
[58] Field of Search ............. 180/68 R, 54 R; 165/51; 123/41.48, 41.49

[56] References Cited

U.S. PATENT DOCUMENTS

| | | | |
|---|---|---|---|
| 2,250,795 | 7/1941 | Fitzgerald et al. | 180/68 R |
| 3,918,547 | 11/1975 | Kramer et al. | 180/68 R X |
| 3,933,136 | 1/1976 | Burst | 180/54 A X |

Primary Examiner—Joseph F. Peters, Jr.
Assistant Examiner—Gene A. Church
Attorney, Agent, or Firm—Ernst H. Ruf

[57] ABSTRACT

The cooling system of a skid-steer loader provides a high mount radiator and employs negative pressure to cool the engine. Circulating air is drawn into the engine compartment at the rear thereof, is carried over the engine and is blown out through the radiator provided at the forward top portion of the engine compartment to cool the fluid circulating therethrough. An oil cooler for hydraulic fluid is mounted underneath the radiator at a forward portion of the engine compartment.

2 Claims, 3 Drawing Figures

ENGINE COOLING SYSTEM FOR A SKID-STEER LOADER

BACKGROUND OF THE INVENTION

A skid-steer vehicle is a compact, highly maneuverable vehicle which employs driving mechanisms on opposite sides of the vehicle for driving each set of wheels mounted thereon independently. The vehicle's maneuverability is further enhanced by a favorable weight ratio for the weight carried at the front and rear axles during loaded and unloaded conditions. It is desirable to provide as compact a vehicle structure as possible to maximize the efficiency of this weight ratio. In a skid-steer vehicle the engine is mounted in the rear and contributes significantly to a 70-30 weight ratio with 70% of the weight of the vehicle overlying the rear axle when the bucket at the front of the vehicle is unloaded. The conventional cooling system of prior art skid-steer vehicles stacks the cooling system in aligned relationship with the engine. That is, the fan, radiator and oil cooler are axially aligned behind the engine. This so-called "engine cooling stack" provides a relatively bulky cooling system.

Therefore, it would be desirable to shorten the length of this stack to provide a relatively compact and efficient cooling system for a skid-steer loader. A more compact cooling system provides a smaller engine compartment, permitting more efficient cooling of the engine and optimizes the weight ratio between the front and rear axles of the vehicles to improve the maneuvering ability of that vehicle.

Therefore, it is an object of the present invention to provide a compact cooling system for a skid-steer vehicle.

SUMMARY OF THE INVENTION

In a skid-steer vehicle embodying the present invention the engine is mounted conventionally in the rear of the vehicle and overlying the rear axle. A fan is mounted rearwardly of the axle, the fan reversely mounted to create negative pressure in the engine compartment. That is, the fan draws ambient air into the engine compartment through louvers provided in the rear portion of the engine compartment, carries the ambient air over the engine and pushes it out through a radiator mounted at an upper front portion of the compartment. An oil cooler is mounted beneath the radiator.

The cooling system of the present invention is substantially more compact than the conventional engine-fan-radiator-oil cooler stack of the prior art and, in fact, reduces the length of such stack by more than 20%. The compact structure of the present invention optimizes the efficiency of the cooling system and improves the maneuverability of the skid-steer vehicle due to the more favorable concentration of vehicle weight over the rear axle.

The present invention is embodied in the drawings provided herewith and such drawings should be considered with the detailed description provided below for a more complete understanding of the invention. The drawings may be described as follows:

PREFERRED EMBODIMENT

Figure 1:
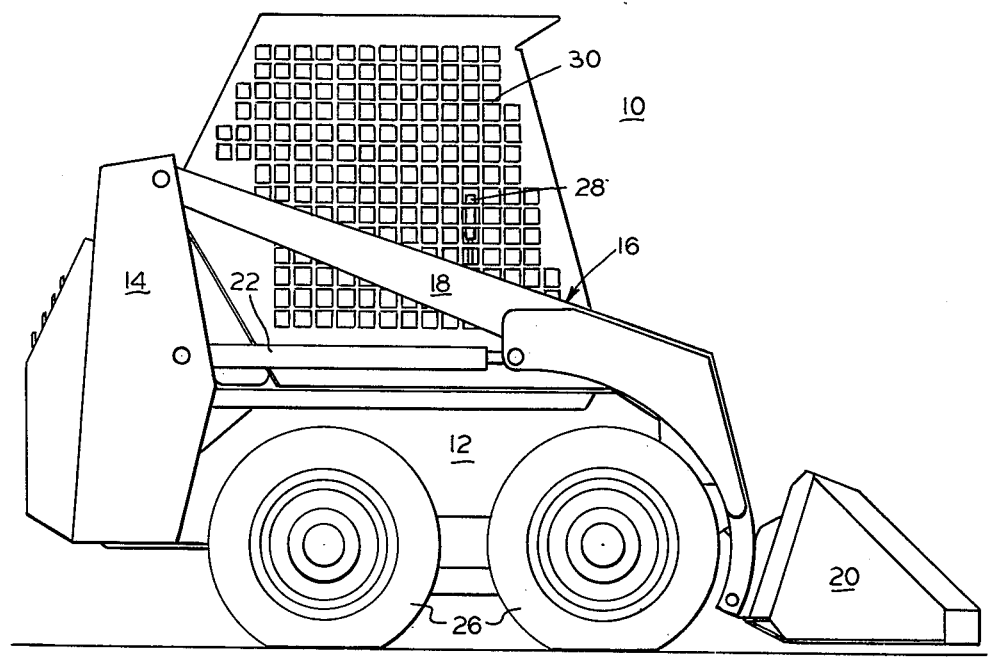
FIG. 1 is a skid-steer vehicle employing the engine cooling system of the present invention.
Figure 2:
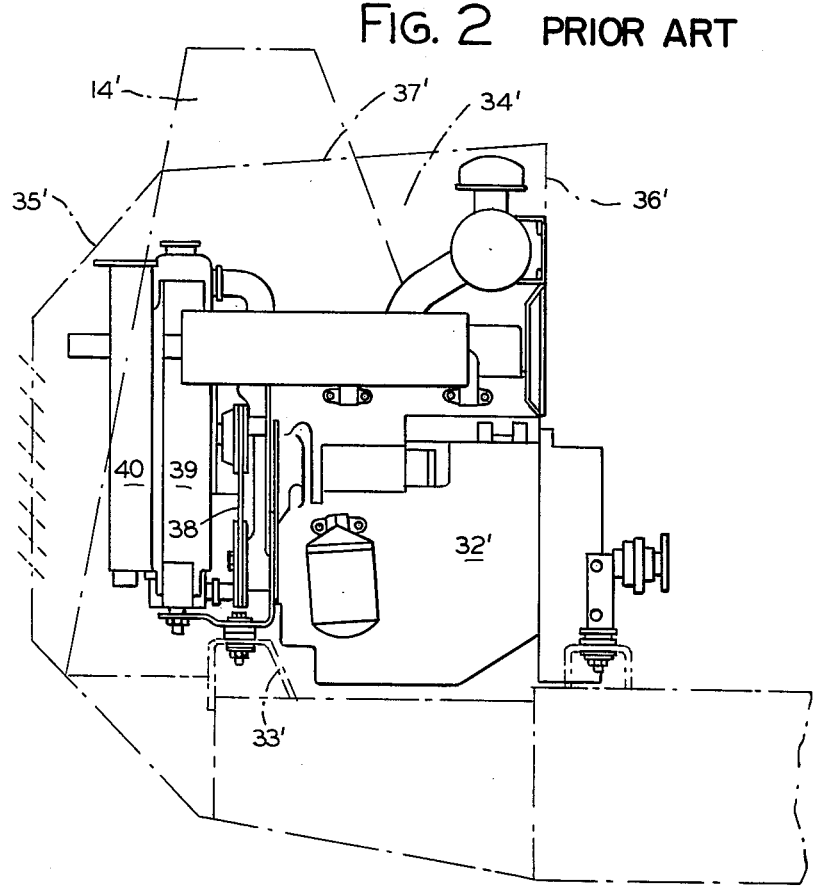
FIG. 2 is a side elevational view of the cooling system of a skid-steer vehicle of the prior art.
Figure 3:
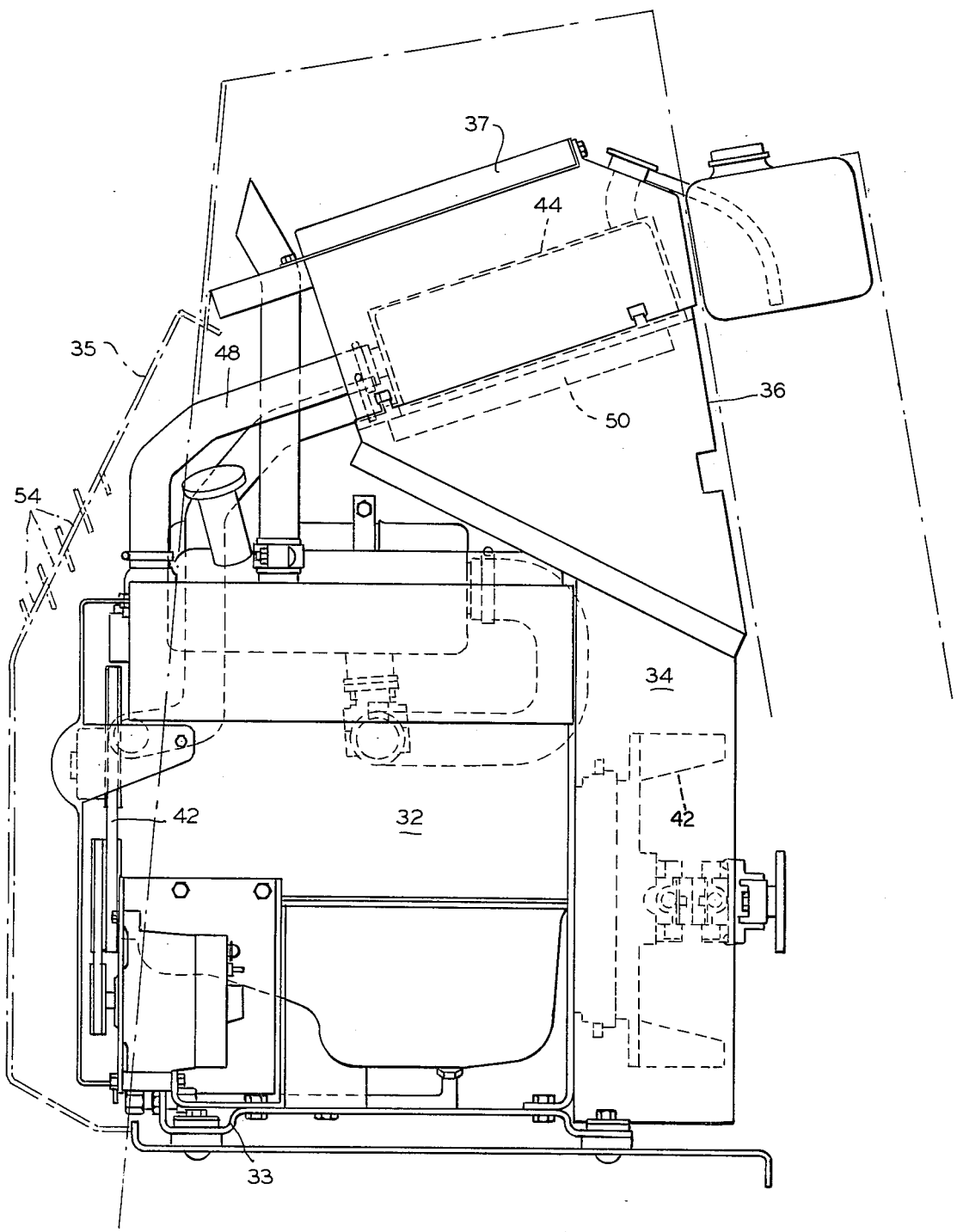
FIG. 3 is a side elevational view of the cooling system of the present invention.

A skid-steer vehicle 10 having a body portion 12 has mounted on opposite sides of the body portion rear uprights 14. The uprights 14 carry at an upper end portion thereof a boom assembly 16 pivotally mounted thereon and comprising opposite boom arms 18. The boom arms 18 extend outwardly at the front end of the vehicle to pivotally engage a bucket 20. Lift cylinders 22 control the boom arms 18 and a tilt cylinder (not shown) controls the bucket 20. Two sets of wheels 26 are provided on opposite sides of the vehicle 10. Each set of wheels 26 is controlled by an independent drive mechanism (not shown) controlled by its individual hand lever 28 provided on opposite sides of the driver's compartment 30. The skid-steer drive is operated by a hydrostatic drive system connected to the engine 32 of the vehicle 10. The drive system shall not be considered in detail but reference may be had to U.S. Pat. No. 3,635,635 and U.S. Pat. No. 3,866,700, assigned to the Assignee of the present invention, for a more complete description of a representative drive system for the vehicle of the present invention. The engine 32 is mounted in an engine compartment 34, defined by the uprights 14, a rear closure 35, a front panel 36 and an upper structure 37.

In the vehicle of the prior art an engine 32' is mounted in an engine compartment 34', defined by uprights 14', a rear closure 35', a front panel 36', and an upper structure 37'. The engine 32' is carried on a rear crossmember 33' underlying the body 12 of the skid-steer vehicle 10. Mounted rearwardly of the engine 32' is a fan 38, a radiator 39 and an oil cooler 40. The engine 32', the fan 38, the radiator 39 and the oil cooler 40 are mounted in stacked relation in the engine compartment to provide a relatively long disproportionate cooling system structure requiring a relatively large engine compartment with resultant cooling inefficiency.

The cooling system of the present invention employs an engine 32 comparable to the engine 32' of the prior art mounted in the engine compartment 34 on a rear crossmember 33 with a fan 42 mounted at the rear of the engine 32 in alignment therewith. A radiator 44 is mounted adjacent the upper structure 37 at a forward end of the engine compartment 34 overlying the engine 32. The radiator 44 is connected to the engine 32 by an L-shaped connection 48. An oil cooler 50 is mounted in the compartment 34 underlying the radiator 44. The rear closure 35 has louvers 54 provided therein to circulate ambient air through the engine. The fan 42 is mounted to provide negative pressure in the engine compartment. That is, the fan 42 draws ambient air into louvers 54 to carry ambient air over the engine and recirculate it out the top of the engine compartment 34 through the radiator 44.

The resultant cooling system concentrates the components of the system providing for a more compact engine structure, reduces the size of the cooling compartment and therefore substantially improves the efficiency of the cooling system. The compact structure of the cooling system of the present invention further concentrates the weight of the engine and its cooling system more closely to the rear axle of the vehicle, thereby to improve the maneuverability of the vehicle.

The present invention therefore provides a more compact, more efficient cooling system which indirectly contributes to the improved maneuverability of the vehicle.

Having thus described a preferred embodiment of the present invention it is recognized that modifications may be made in certain of the structure described without affecting the scope of the invention. The limits of the present invention are defined by the claims as set forth below.

We claim:

1. A cooling system for a skid-steer vehicle, the vehicle having a body portion, uprights mounted on the body portion at the rear thereof and on opposite sides, a boom assembly carried on the uprights and extending forwardly downwardly on opposite sides of the vehicle, an engine compartment defined by the uprights, support means underlying the engine compartment, a rear closure having ventilating openings therein, a front panel and an upper structure, the cooling system providing, an engine mounted in the engine compartment at the rear of the skid-steer vehicle on the support means provided, a fan mounted in closely spaced relation at the rear of the engine and aligned therewith to provide a compact fan-engine combination, the fan adapted to provide negative pressure to draw circulating air into the engine compartment, and a radiator mounted at a forward upper end of the engine compartment and overlying the engine mounted therein whereby air is drawn through the openings in the rear closure compartment by the fan, circulates through the compartment, and exits through the radiator provided at the forward upper end of the compartment.

2. A cooling system as claimed in claim 1 including an oil cooler, the oil cooler being disposed remotely from the engine and mounted in the engine compartment underlying the radiator mounted at an upper forward end of the compartment.

* * * * *